(12) United States Patent  (10) Patent No.: US 8,924,332 B2
Maciejewski et al.  (45) Date of Patent:  Dec. 30, 2014

(54) FORECASTING HOTSPOTS USING PREDICTIVE VISUAL ANALYTICS APPROACH

(75) Inventors: Ross Maciejewski, Phoenix, AZ (US); Ryan Hafen, West Richland, WA (US); Stephen Rudolph, Tempe, AZ (US); William Cleveland, Lafayette, IN (US); David Ebert, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 174 days.

(21) Appl. No.: 13/322,626

(22) PCT Filed: May 28, 2010

(86) PCT No.: PCT/US2010/036653
§ 371 (c)(1),
(2), (4) Date: Jan. 30, 2012

(87) PCT Pub. No.: WO2010/138864
PCT Pub. Date: Dec. 2, 2010

(65) Prior Publication Data
US 2013/0031041 A1    Jan. 31, 2013

Related U.S. Application Data

(60) Provisional application No. 61/182,164, filed on May 29, 2009.

(51) Int. Cl.
*G06F 17/00* (2006.01)
*G06N 5/02* (2006.01)
*G06Q 10/10* (2012.01)
*G06F 17/18* (2006.01)

(52) U.S. Cl.
CPC ............ *G06F 17/18* (2013.01); *G06Q 10/10* (2013.01)
USPC ............................................................. 706/46

(58) Field of Classification Search
USPC ............................................................. 706/46
See application file for complete search history.

(56) References Cited

U.S. PATENT DOCUMENTS

| 7,917,458 B2 * | 3/2011 | Dalton ............................ 706/46 |
| 2005/0222829 A1 | 10/2005 | Dumas |
| 2006/0106530 A1 | 5/2006 | Horvitz et al. |
| 2008/0010262 A1 | 1/2008 | Frank |
| 2008/0125969 A1 | 5/2008 | Chen et al. |
| 2011/0106743 A1 * | 5/2011 | Duchon ............................ 706/46 |

OTHER PUBLICATIONS

Forecasting Hotspots—A Predictive Analytics Approach Ross Maciejewski, Member, IEEE, Ryan Hafen, Stephen Rudolph, Stephen G. Larew, Michael A. Mitchell, William S. Cleveland, David S. Ebert, Fellow, IEEE Journal of Latex Class Files, vol. 6, No. 1, Jan. 2007.*

(Continued)

*Primary Examiner* — Kakali Chaki
*Assistant Examiner* — Ababacar Seck
(74) *Attorney, Agent, or Firm* — Maginot, Moore & Beck, LLP

(57) ABSTRACT

A method for forecasting hotspots is provided. The method may include the steps of receiving input data at an input of the computational device, generating a temporal prediction based on the input data, generating a geospatial prediction based on the input data, and generating output data based on the time series and geospatial predictions. The output data may be configured to display at least one user interface at an output of the computational device.

16 Claims, 7 Drawing Sheets

(56) References Cited

OTHER PUBLICATIONS

Understanding Syndromic Hotspots—A Visual Analytics Approach Ross Maciejewski Stephen Rudolph Ryan Hafen Ahmad Abusalah Mohamed Yakout Mourad Ouzzani William S. Cleveland Shaun J. Grannis† Michael Wade‡ David S. Ebert.*

Syndromic surveillance: STL for modeling, visualizing, and monitoring disease counts Ryan P Hafen*1, David E Anderson2, William S Cleveland1, Ross Maciejewski3, David S Ebert3, Ahmad Abusalah4, Mohamed Yakout4, Mourad Ouzzani4 and Shaun J Grannis5,6.*

Mapping Crime: Understanding Hot Spots John E. Eck, Spencer Chainey, James G. Cameron, Michael Leitner, and Ronald E. Wilson NCJ 209393.*

International Search Report for related international application No. PCT/US2010/036653, report dated Dec. 28, 2010.

* cited by examiner

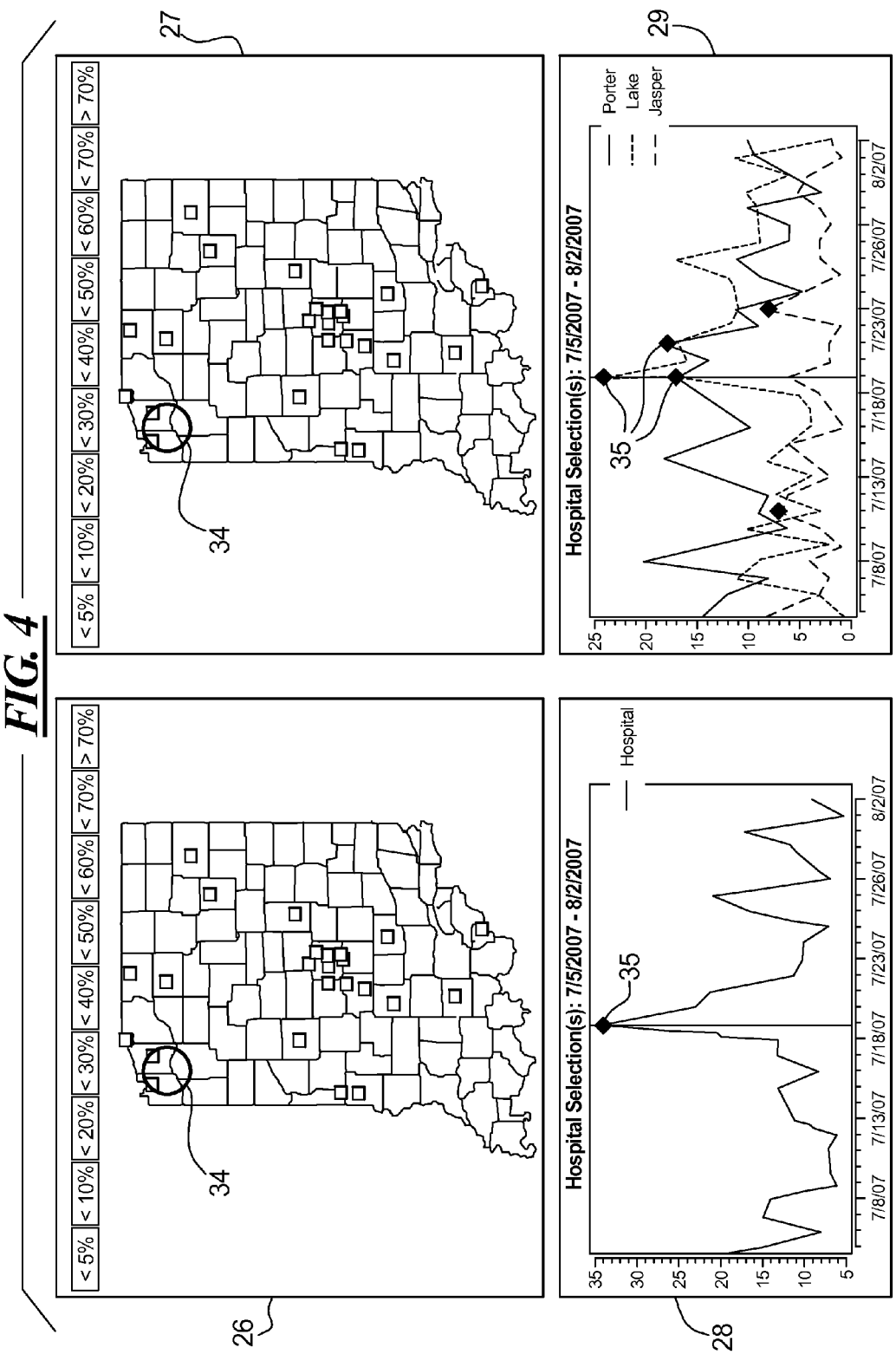

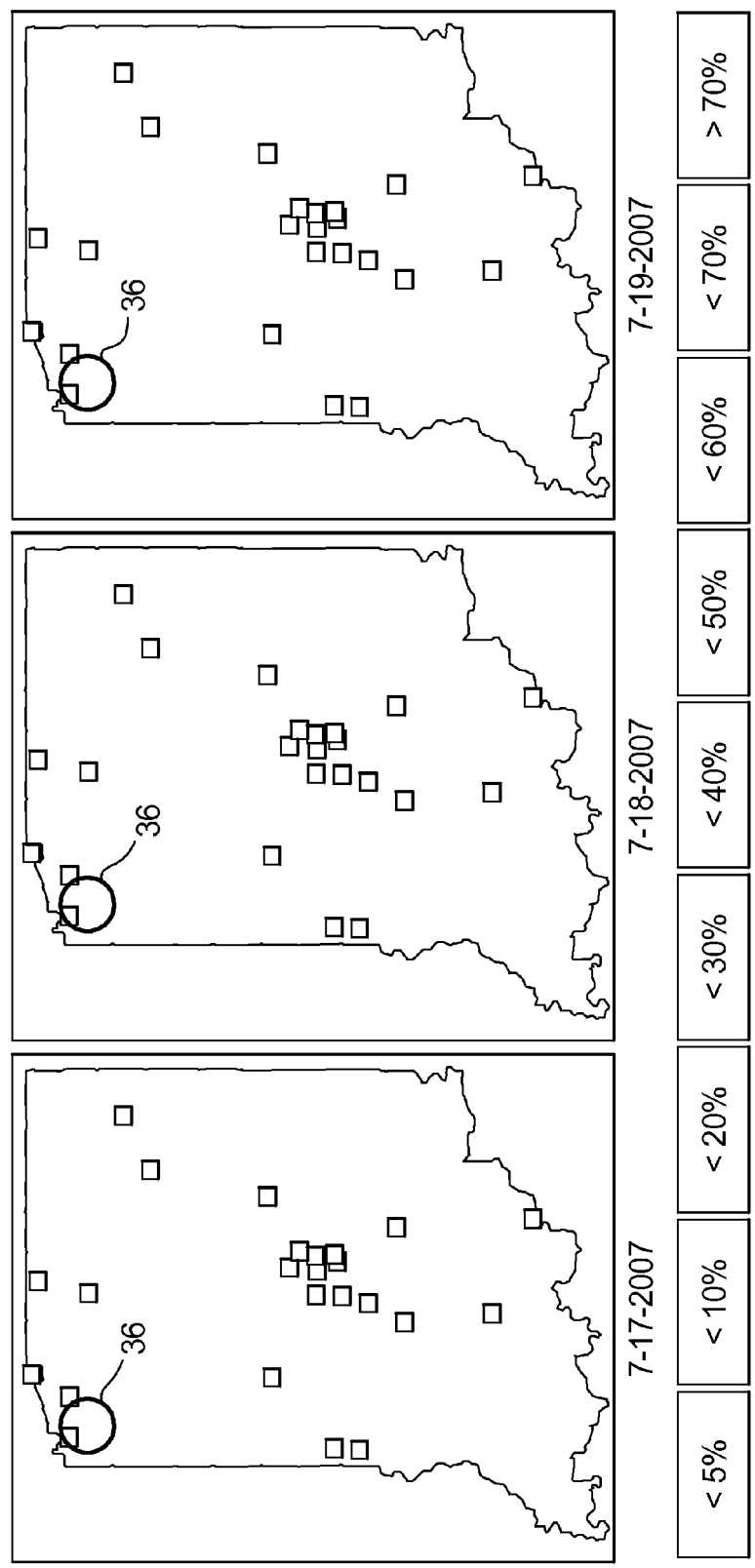

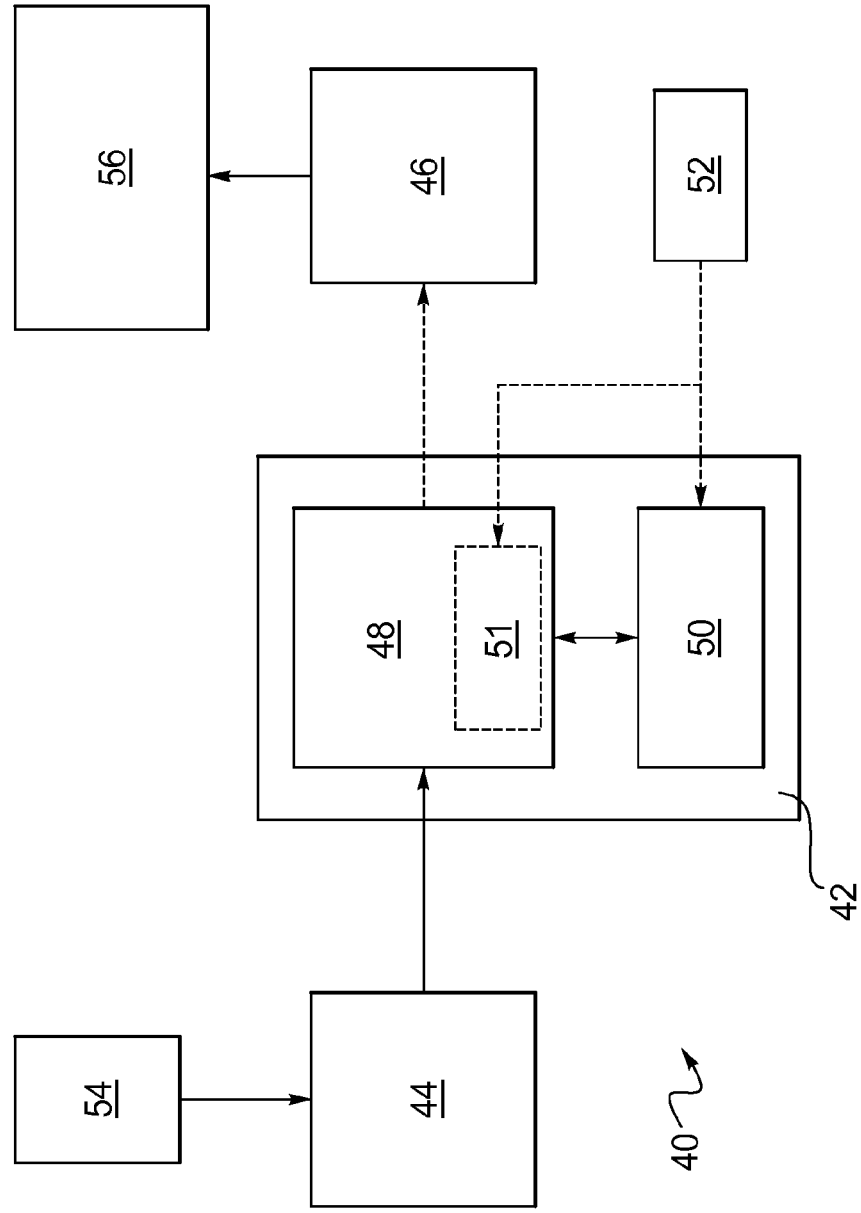

FORECASTING HOTSPOTS USING PREDICTIVE VISUAL ANALYTICS APPROACH

CROSS-REFERENCE TO RELATED APPLICATIONS

This application is a U.S. National Stage filing under 35 USC §371 of International Patent Application No. PCT/US2010/036653 filed on May 28, 2010, which claims priority under 35 USC §119(e) to U.S. Provisional Application Ser. No. 61/182,164 filed on May 29, 2009.

STATEMENT REGARDING FEDERALLY SPONSORED RESEARCH OR DEVELOPMENT

This invention was made with government support under DE-AC05-76RL01830 awarded by Department of Energy. The government has certain rights in the invention.

BACKGROUND

1. Technical Field

The present disclosure generally relates to predictive visual analytic tools, and more particularly, to systems and methods for generating predictive models of spatiotemporal events.

2. Description of the Related Art

Visual analytic systems are commonly used in the art to provide analysts with the ability to study trends in various data using interactive visual interfaces. Moreover, visual analytic systems allow analysts to interactively explore the collection of any data through linked windows or views, temporal histories, document aggregations and numerous other displays. The linked views and interactive displays provide insight to otherwise substantially hidden correlations between space, time, events, people and places. Specifically, analysts can search for particular events of interest through statistical tools that are linked to the visual displays, so as to analyze the data at a deeper level and form hypotheses based upon the available information. Although currently existing visual analytic systems may allow analysts to generate some hypotheses with respect to future events, there is still much room for improvement.

As applied today, the primary use of analytic systems is purely reaction-based, or operates only in response to an event that has already occurred. More specifically, analytic systems are typically directed toward temporal alert generation, wherein an algorithm monitors for unexpected events and triggers an alert in response to an unexpected event that is detected by the algorithm. While this allows analysts to better respond to events and redistribute resources in an effort to minimize the effects of the events, these analytic systems are still unable to help analysts predict and deter such events. Furthermore, many of these analytic systems have been found to become intractable as the data set grows.

Some analytic systems exist for use in the realm of syndromic surveillance. Such systems include the Early Aberration Reporting System (EARS) and the Electronic Surveillance System for the Early Notification of Community based Epidemics (ESSENCE). Although these systems provide analysts with some means of monitoring events, data exploration and associated analytic capabilities offered by such systems are limited to reactive rather than proactive alerts. These systems are additionally known to generate too many false positives for epidemiologists to analyze.

Therefore, there is a need for systems and methods which provide comprehensive analyses of current and past events, but also provide more comprehensive predictions for future events. Moreover, there is a need for systems and methods which indicate regions of space and time with unusually high incidences of events or hotspots, predict the growth of such regions so as to plan resource allocation and preventative measures, and further, predict where future hotspots may occur. There is also a need for systems and methods that are able to process a collection of substantially large data sets efficiently and with greater degree of accuracy.

SUMMARY OF THE DISCLOSURE

In one aspect of the present disclosure, a method for forecasting hotspots is provided. The method may include the steps of receiving input data at an input of the computational device, generating a temporal prediction based on the input data, generating a geospatial prediction based on the input data, and generating output data based on the time series and geospatial predictions. The output data may be configured to display at least one user interface at an output of the computational device.

In another aspect of the present disclosure, a system for forecasting hotspots is provided. The system may include an input device, an output device and a computational device coupled to each of the input and output devices. The computational device may include a microprocessor and a memory for storing an algorithm for forecasting hotspots. The algorithm may configure the computational device to receive input data at the input device, generate a temporal prediction based on the input data, generate a geospatial prediction based on the input data, generate output data based on the temporal and geospatial predictions, and output a user interface to be displayed at the output device. The user interface may be representative of the output data.

In yet another aspect of the present disclosure, a computer program product is provided. The computer product may include a computer-readable medium having control logic stored therein for configuring a computer to forecast hotspots. The control logic may include a series of program code. The program code may configure the computer to receive statistical input data, generate a temporal prediction based on the statistical input data, generate a geospatial prediction based on the statistical input data, generate analytic output data based on the temporal and geospatial predictions, and output the analytic output data to a display device.

Other advantages and features will be apparent from the following detailed description when read in conjunction with the attached drawings.

BRIEF DESCRIPTION OF THE DRAWINGS

The disclosed systems and methods for forecasting hotspots are described more or less diagrammatically in the accompanying drawings wherein:

FIG. 4 is a pictorial view of user interfaces provided by the method of FIG. 1;

FIG. 5 is a pictorial view of another user interface provided by the method of FIG. 1;

FIG. 7 is a schematic view of an exemplary system for forecasting hotspots constructed in accordance with the teachings of the present disclosure.

It should be understood that the drawings are not necessarily to scale and that the embodiments are sometimes illustrated by graphic symbols, phantom lines, diagrammatic representations and fragmentary views. In certain instances, details which are not necessary for an understanding of this disclosure or which render other details difficult to perceive may have been omitted. It should be understood, of course, that this disclosure is not limited to the particular embodiments and methods illustrated herein.

DETAILED DESCRIPTION OF THE PRESENTLY PREFERRED EMBODIMENTS

Figure 1:
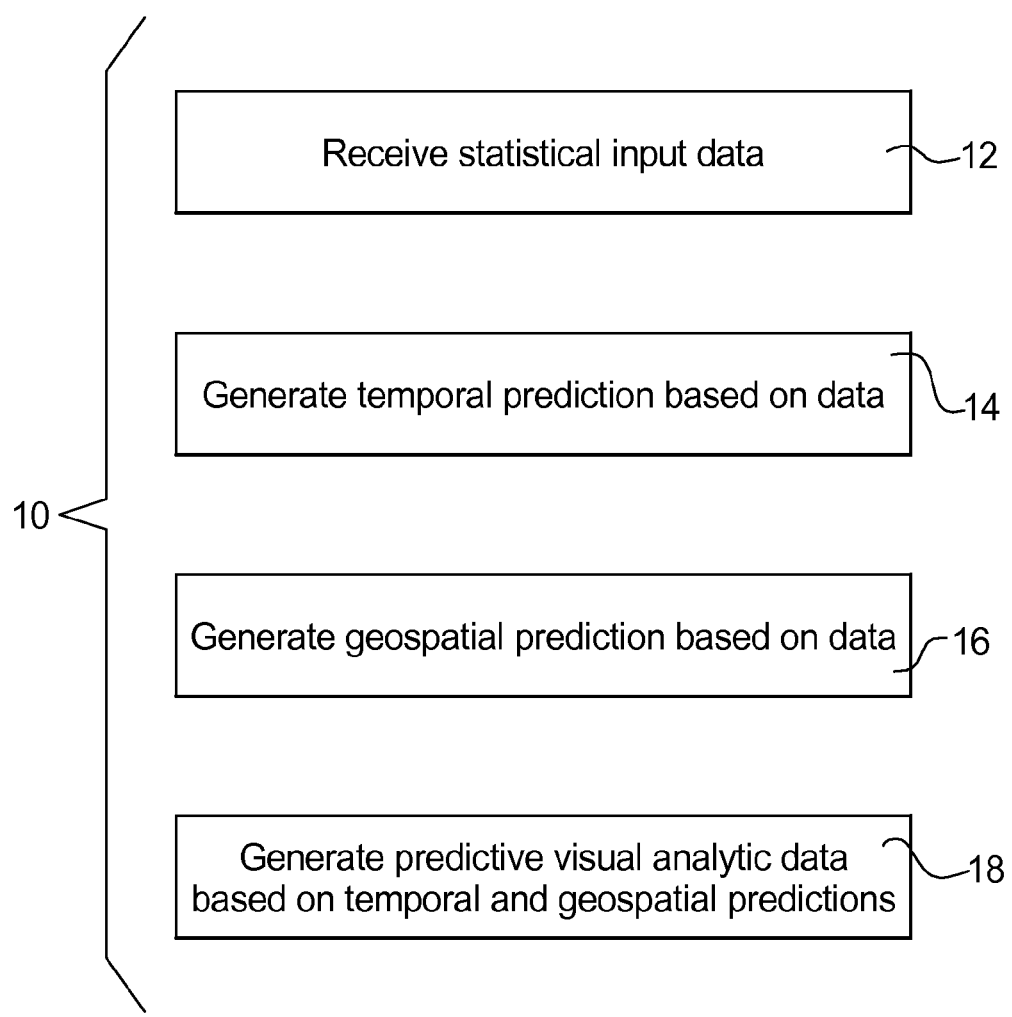
FIG. 1 is a flow chart of an exemplary method for forecasting hotspots constructed in accordance with the teachings of the present disclosure.

Turning first to FIG. 1, an exemplary method 10 that is configured to forecast hotspots, or regions of space and time with unusually high incidences of events, is disclosed. Moreover, the method 10 may be used provide advanced interactive visualization and analyses so as to link environments of geospatial data and time series graphs. Time series events may be forecast for a range of spatial aggregations to further provide a context in which to explore potential future events. Time series alerts may be generated for current and predicted event thresholds, by which analysts may be able to explore future event bounds for resource management and response scenarios. Alerts generated in the temporal realm may be quickly analyzed in the geospatiotemporal interface to help analysts find patterns in both the spatial and temporal domains simultaneously. Event distributions may be generated based on all events that are recorded with respect to any central data collection location, such as a financial institution, or for instance, a police department, a fire department, or any other emergency response department. The event distribution feature may then be used to place predicted events, which may then be correlated with historical data to model the expected geospatial density of events and maintain temporal coherence with hotspots. In such a way, the method 10 of FIG. 1 may provide insight into the ongoing impact of current events and provide advanced warning for future events so as to improve interdiction and response.

To accomplish this, the method 10 of FIG. 1 may include a step 12 of receiving statistical input data, a step 14 of generating a time series prediction based on the input data, a step 16 of generating a geospatial prediction based on the input data, and a step 18 of generating analytic output data based on the time series and geospatial predictions. In an initial step 12, the method 10 may be configured to receive statistical input data, which may include categorical geospatiotemporal event data derived from, for example, financial data, crime reports, emergency department logs, and the like. Each event may provide information pertaining to the associated location in time and/or space, and further, may be sorted according to a hierarchical event categorization structure, or the like. The categories may be filtered by linked data, such as demographic information, or the like. The events may be mapped to a particular spatial location. Moreover, the data categories may typically be processed as time series aggregated over a spatial location, such as a county, a zip code, a collection station, or the like, or alternatively, as spatial snapshots of a small time aggregate, such as a day, a week, or the like.

In one aspect of the present application, the method 10 of FIG. 1 may be applied to a representative categorical geospatiotemporal data set, or syndromic surveillance data. Syndromic surveillance may be defined as an area of healthcare monitoring that focuses on the detection of adverse health events using pre-diagnosis information from emergency departments. Syndromic surveillance data is commonly known in the art as providing meaningful measures for disease risks in various populations. Such data may be received from, for example, data provided by the Indiana State Department of Health (ISDH) through their Public Health Emergency Surveillance System (PHESS). An organization such as PHESS may electronically transmit patient data in the form of, for example, emergency department chief complaints from 77 hospitals located throughout the state of Indiana at an average rate of about 7500 records per day. The complaints may be classified into nine categories including, for example, respiratory, gastro-intestinal, hemorrhagic, rash, fever, neurological, botulinic, shock/coma, and the like. The complaints may be used as indicators to detect public health emergencies before such an event is confirmed by diagnosis or overt activity.

In step 14 of FIG. 1, the method 10 may be configured to generate time series predictions based on the statistical input data received in step 12. More specifically, temporal modeling may be performed over a spatial aggregation of data, or the collection of all event records over the state, county or data collection agency that make up the time series. For multivariate data, each event category may be modeled as a separate time series signal. To generate a time series prediction, both a moving average as well as a seasonal-trend decomposition model may be used. The resulting time series predictions may be used to help prepare for predicted events. In the case of a predicted outbreak, for instance, time series predictions may serve to inform appropriate staff members of the type of outbreak, the regions affected by the outbreak, the symptoms associated with the outbreak, the number of people that may be affected, the corresponding number of antibiotics or medications that may be required, and the like.

With respect to outbreak detection using time series analysis, a commonly used epidemiological algorithm is the Early Aberration Reporting System (EARS) alert algorithm based on cumulative summation (CUSUM). According to CUSUM, $$S_t = \max\left(0, S_{t-1} + \frac{X_t - (\mu_0 + k\sigma_{x_t})}{\sigma_{x_t}}\right) \quad (1)$$

where $S_t$ may be the current CUSUM, $S_{t-1}$ may be the previous CUSUM, $X_t$ may be the count at the current time, $\mu_0$ may be the expected value, $\sigma_{x_t}$ may be the standard deviation and k may be the detectable shift from the mean, for example, the number of standard deviations the data may be from the expected value before an alert is triggered. In one particular application, a 28 day sliding window with a 3 day lag may be applied to calculate the mean, $\mu_0$, and standard deviation, $\sigma_{x_t}$. More specifically, the mean and standard deviation may be calculated on a 28 day window three days prior to the day in question. Such a lag may be used to increase sensitivity to continued outbreaks. With the 3 day lag, the current time series may be extended into the future by calculating the mean of the sliding window. This may provide analysts with both an expected value for the next three days, or any other specified amount of lag, and an alert threshold. Such a moving average may be useful for quickly providing, for example, an expected average number of incoming patients, and thresholds may be useful for quickly determining alert levels.

To more accurately model the data, the time series may be viewed as the sum of multiple components of variation. To separate the time series into its various components, seasonal-trend decomposition model based on a locally weighted scatterplot smoothing (LOESS) may be employed. Seasonal-trend components of variation may result from smoothing the data using moving weighted-lease-squares polynomial fitting, or LOESS, with a moving window bandwidth in days. The degree of the polynomial may be 0 (locally constant), 1 (locally linear), or 2 (locally quadratic). In order to appropriately model the time series using seasonal-trend decomposition based on LOESS, the mean and variance of the data may need to be independent of one another. A power transformation may be applied to the data to accomplish this. In time series analysis, the logarithm transformation may be applied when the mean is proportional to the standard deviation. In cases where the data comprises counts following a Poisson distribution, a square root transformation may be applied to ensure that the mean is independent of the standard deviation. Analysis of the syndromic surveillance data received in step 12 may show that the square root transformation stabilizes the variability and yields a more Gaussian distribution of the time series residuals. Accordingly, the seasonal-trend modeling may be performed on the square root scale of the original series in order to remove the dependence of a signal's variance on its mean.

In exemplary application of step 14, the daily patient count data of a given hospital may be decomposed into a day-of-the-week component, a yearly-seasonal component that models seasonal fluctuations, and an inter-annual component which models long term effects, such as hospital growth. The decomposition may be expressed by $$\sqrt{Y_t} = T_t + S_t + D_t + r_t \quad (2)$$

where for the t-th day, $Y_t$ may be the original series, $T_t$ may be the inter-annual component, $S_t$ may be the yearly-seasonal component, $D_t$ may be the day-of-the-week effect and $r_t$ may be the remainder. The method 10 may initially proceed to extract the day-of-the-week component, $D_t$. For example, a low-middle frequency component may be fitted using locally linear fitting with a bandwidth of 39 days. The value of $D_t$ may be the result of means for each day-of-the-week of the $\sqrt{Y_t}$ minus the low-middle-frequency component. The current value of $D_t$ may then be subtracted from the $\sqrt{Y_t}$ and the low-middle-frequency may then be re-computed. The iterative process may be repeated until the values converge. Upon removing the day-of-the-week component from the data, LOESS smoothing may be used to extract the inter-annual component, $T_t$, using, for example, local linear smoothing with a bandwidth of 1000 days. The LOESS smoothing may be applied again to the data with the day-of-the-week and inter-annual components removed to extract the yearly-seasonal component, $S_t$. The yearly-seasonal component, $S_t$, may be obtained using, for example, local quadratic smoothing with a bandwidth of 90 days. Once the day-of-the-week, inter-annual and yearly-seasonal components have been extracted from the time series, the remainder, $r_t$, may be determined to be adequately modeled as independent identically distributed Gaussian white noise, indicating that all predictable sources of variation have been captured in the model.

Based on the statistical properties of LOESS, the fitted values $\hat{Y} = (\hat{Y}_1, \ldots, \hat{Y}_n)$ may be linear transformations of the observed data, $Y = (Y_1, \ldots, Y_n)$. In particular, each step of the seasonal-trend decomposition may involve a linear filter of the data, wherein an output time series $x = \{x_1, \ldots, x_n\}$ may be generated by an input time series $w = w_1, \ldots, w_n$ through a linear combination $$x_i = \sum_{i=1}^{n} h_{ij} w_j. \quad (3)$$

If H is a matrix whose (i, j)-th element may be $h_{i,j}$, then $$x = Hw \quad (4)$$

or more particularly, H may be the operator matrix of the filter. In such a way, $H_D$, $H_S$ and $H_T$ may denote operator matrices of the day-of-the-week, yearly-seasonal and inter-annual filters, respectively, each having n×n dimensions. Once each of the operator matrices $H_D$, $H_S$ and $H_T$ has been determined, the operator matrix for the overall procedure, H, may be written as $$H = H_D + H_T(I - H_D) + H_S(I - H_D - H_T(I - H_D)) \quad (5)$$

where I may be the identity matrix. As shown in equation (5), the day-of-the-week smoothing, $H_D$, may be applied directly to the raw data, the inter-annual smoothing, $H_T$, may be applied to the raw data with the day-of-the-week components removed, and further, the yearly-seasonal smoothing, $H_S$, may be applied to the raw data with the day-of-the-week and inter-annual components removed. The fitted values may then be obtained using the expression $$\hat{Y} = HY. \quad (6)$$

From this, the variance of the fitted values may be easily obtained using $$\text{Var}(\hat{Y}_i) = \hat{\sigma}^2 \sum_{j=1}^{n} H_{ij}^2 \quad (7)$$

where $\hat{\sigma}^2$ may be the variance of Y, and further, may be estimated from the remainder term $r_t$.

In order to predict, for instance, x days ahead, the operator matrix H may be appended with x new rows, which may be obtained from predicting ahead within each linear filter. The appended operator matrix may then be used to obtain the predicted value and variance. For example, to predict the value for day n+1, the resulting fitted values and variance may be $$\hat{Y}_{n+1} = \sum_{j=1}^{n} H_{n+1,j} Y_j \quad (8)$$

and $$\text{Var}(\hat{Y}_{n+1}) = \hat{\sigma}^2 \left(1 + \sum_{j=1}^{n} H_{n+1,j}^2\right). \quad (9)$$

Accordingly, a 95% prediction interval may be calculated as $$\hat{Y}_{n+1} \pm 1.96 \sqrt{\text{Var}(\hat{Y}_{n+1})}. \quad (10)$$

Figure 2:
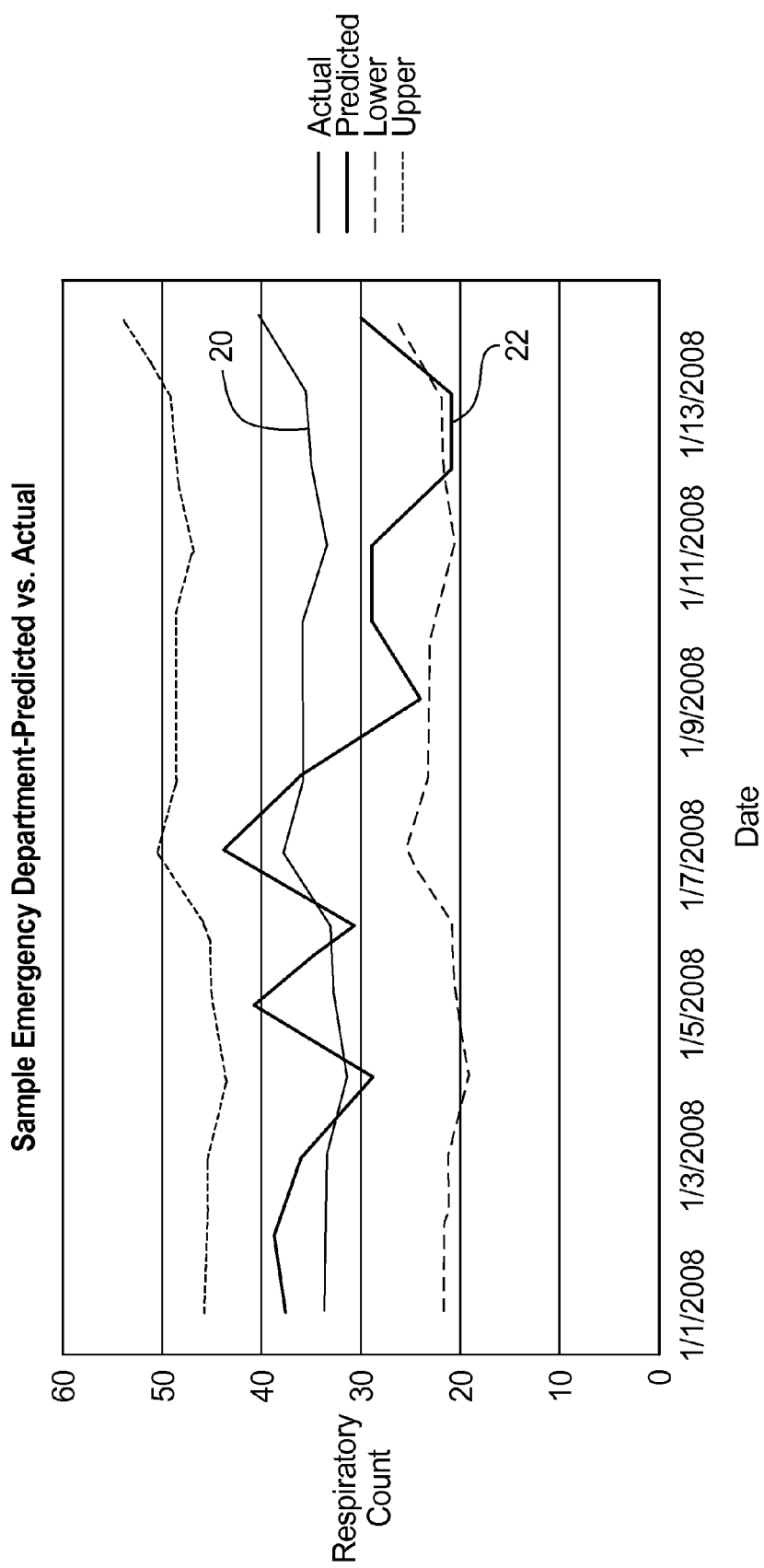
FIG. 2 is a graphical view of a temporal prediction provided by the method of FIG. 1.

Accuracy of the time series predictions may be demonstrated with real data, for example, data acquired via PHESS from Jan. 1, 2006 through Dec. 31, 2007 for a single emergency department. The seasonal-trend modeling and prediction techniques may be applied to the data to generate predictions for Jan. 1, 2008 through Jan. 14, 2008. The resulting predictions may then be compared to the actual data, as shown in the comparison plot of FIG. 2. Although the accuracy may decrease as the predictions move further into the future, the signal 20 corresponding to the prediction model may be able to capture and substantially mimic the key properties of the signal 22 corresponding to the actual events.

Figure 3A:
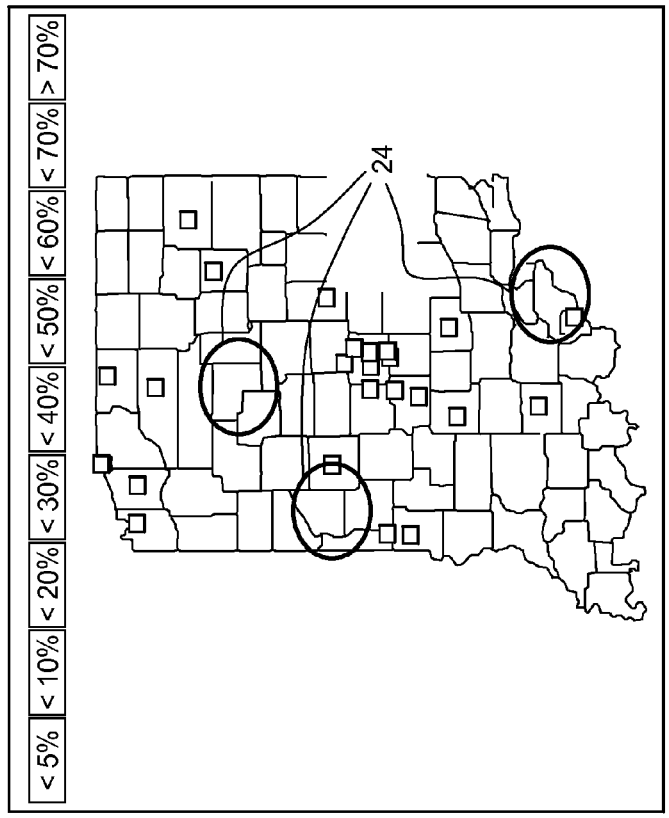
FIGS. 3A-3B are pictorial views of a spatiotemporal prediction provided by the method of FIG. 1.
Figure 3B:
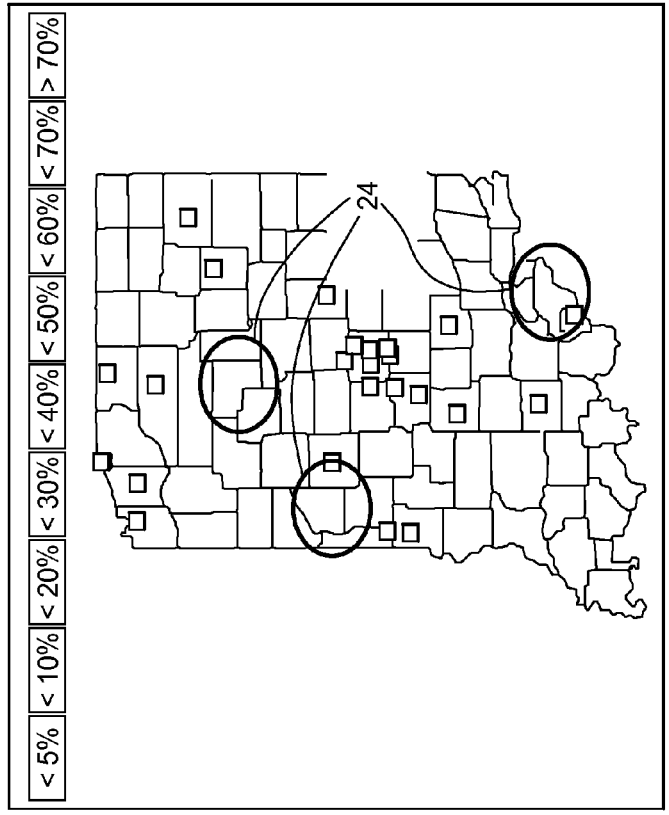

Referring back to FIG. 1, the method 10 may further include a step 16 of generating geospatial predictions. While the time series or temporal predictions provided by step 14 may forecast the number of expected events, geospatial predictions may provide analysts with insight into the expected spatial distributions of such events. Because the time series predictions may be performed over a wide variety of spatial aggregations, it may be possible to select between different granularities of the spatial prediction to provide, for instance, a geographically aggregated distribution and a spatiotemporal distribution. In a geographically aggregated distribution, spatial predictions may be generated by employing the time series counts based on an arbitrary geographic boundary, for example, a state, county, a zip code, or the like, and visualizing the information in the form of a color map. Predictions for a particular day may result in the actual number of events that occurred and the predicted number of events, or only the predicted number of events. Such values may provide analysts with several different comparisons. In one such comparison, the seasonal-trend decomposition and moving average predictions may be compared with one another to see where the models disagree, as shown in FIGS. 3A and 3B. More specifically, the seasonal-trend decomposition model in FIG. 3A may be illustrated using a color map to depict the different regions and their associated event predictions for a particular day. Similarly, the moving average model in FIG. 3B may be illustrated using the same color map to depict the different regions and their associated event predictions for the same day. By simultaneously scrolling through each of the two models of FIGS. 3A and 3B through time, an analyst may be able to flag those regions or counties which disagree between the models, such as the indicated regions 24, and monitor those regions with more caution.

In contrast with a geographically aggregated distribution, a spatiotemporal distribution may be able to incorporate a finer granularity of event distributions. Using, for example, data provided by PHESS, it may be possible to model the spatiotemporal distribution of patients visiting emergency departments. More specifically, a modified variable kernel method may be used, for example, $$\hat{f}(x) = \frac{1}{N}\sum_{i=1}^{N} \frac{1}{\max_{(h,d_{i,k})}} K\left(\frac{x - X_i}{\max_{(h,d_{i,k})}}\right) \quad (11)$$

which may scale the parameter of the estimation by allowing the kernel width to vary based upon the distance from $X_i$ to the k-th nearest neighbor in a set having N−1 points. The corresponding window width of the kernel placed on point $X_i$ may be proportional to $d_{i,k}$, where $d_{i,k}$ may be the distance from the i-th sample to the k-th nearest neighbor. Accordingly, data points in regions where the data may be sparse may have flatter kernels, and h may correspond to the minimum allowed kernel width. Furthermore, to reduce calculation times, the Epanechnikov kernel may be used, for example, $$K(u) = \frac{3}{4}(1 - u^2)1_{(\|u\|\le 1)} \quad (12)$$

where the function $1_{(\|u\|\le 1)}$ may evaluate to 1 if the inequality is true, or alternatively, evaluate to 0 in all other cases.

Using the predicted number of events from the time series predictions of step 14 as well as the probability density function of event locations from the geospatial predictions of step 16, it may be possible to generate output data, or distribute and map the events with respect to some shared geographic location, in step 18. Referring back to the syndromic surveillance data received by step 12, for example, the population distribution provided by a particular emergency department may be modeled. For each emergency department, it may be possible to obtain each patient's home address, which may further be mapped to a grid centered about the local hospital. Using equation (11) above, it may be possible to generate a distribution function which represents the probability that a particular patient will go to the hospital from a given coordinate, such as a (latitude, longitude) pair. The n predicted events may then be randomly distributed according to the distribution function obtained. Performing similar iterations for other surrounding emergency departments may serve to simulate patient distributions across several regions and counties, or extended to simulate patient distributions across one or more states.

Once the events are distributed, output data in the form of a three-dimensional array may be generated having, for instance, a visualization of a grid of patient locations across a predicted day as well as the previous t days. A three-dimensional kernel density estimation may then be performed to maintain the temporal coherence of previous hotspots. This may be used to analyze if such locations would persist under the assumption that patients will visit a particular emergency department based solely on the service area distribution of that emergency department. The estimated density of a particular day's events, which may incorporate temporal history, may be plotted as a ratio of the number of events under analysis versus the total number of events, which may also incorporate temporal history.

Figure 6:
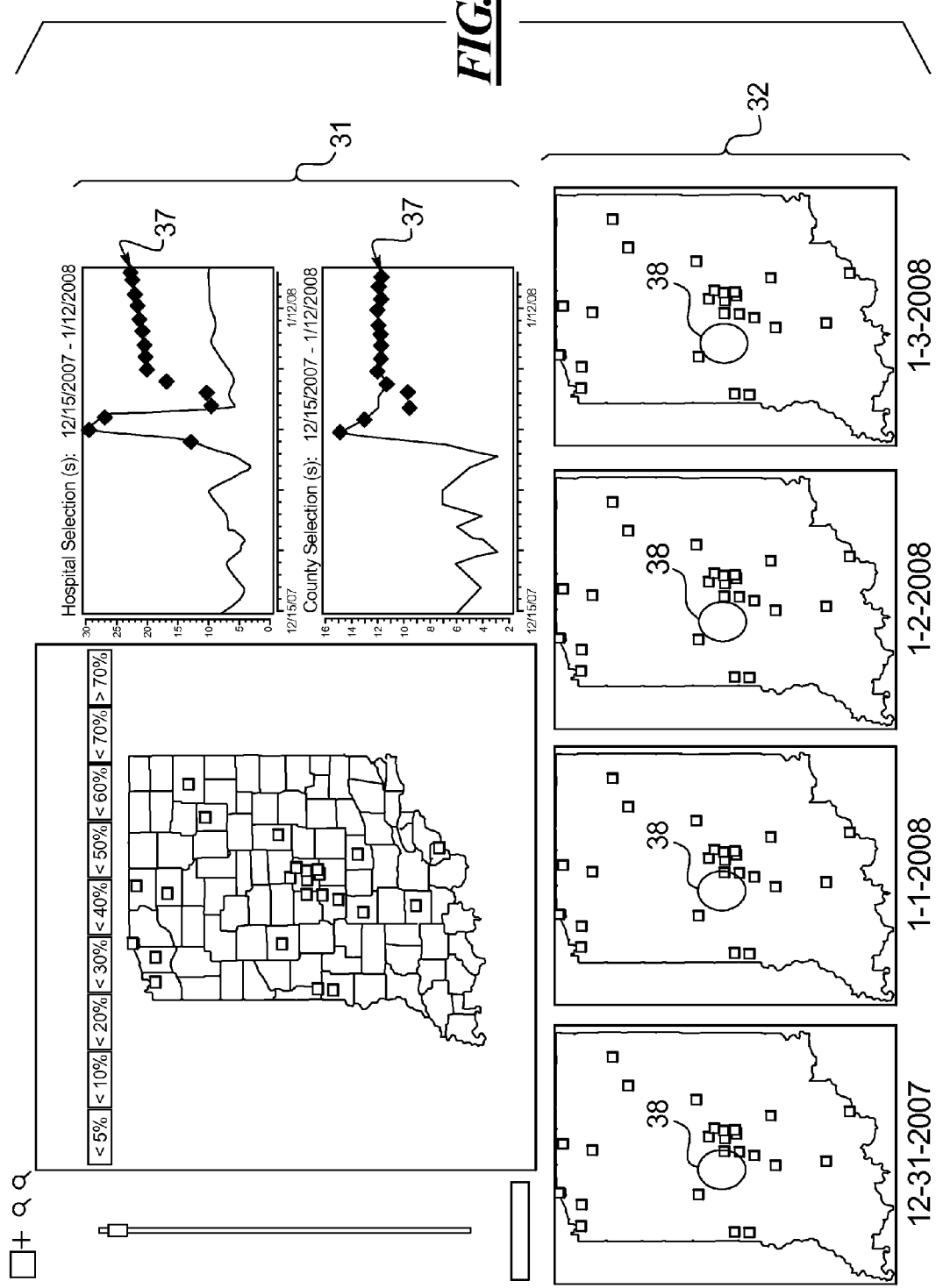
FIG. 6 is a pictorial view of additional user interfaces provided by the method of FIG. 1.

Based on the output data generated by the method 10 of FIG. 1, one or more user interfaces 26-32 as shown in FIGS. 4-6 may be provided at a display that is accessible to analysts. By combining temporal and geospatial visualization techniques, the method 10 and the associated user interfaces 26-32 may provide analysts with real-time hypothesis testing and event prediction capabilities. In applying the method 10 to sample syndromic surveillance data with known outbreaks, it is possible to provide retrospective and prospective case analyses and demonstrate the relative accuracy of the method 10. The sample data may include, for example, two years worth of synthetic syndromic surveillance data from Jan. 1, 2006 to Dec. 31, 2007, which further incorporates data from 33 emergency departments across the state of Indiana and two known outbreaks.

In exploring the retrospective and reactive case analysis, a simulated outbreak containing patients presenting signs of respiratory illness may be introduced beginning on Jul. 18, 2007 and ending on Jul. 22, 2007. The injection of patients may be introduced according to a log-normal distribution such that the number of excess patients showing respiratory syndrome symptoms may be 1 on Jul. 18, 2007, and 18, 8, 5, 3 and 2 for each subsequent day. As shown in FIG. 4, the method 10 may respond by generating a set of user interfaces 26-29 that are observable by an analyst. Specifically, first and second user interfaces 26, 27 may provide color mapped geospatial views at a county level aggregation. In the disease injection area 34 of the first user interface 26, the affected counties may only show a slightly higher percentage of respiratory illness than neighboring counties. However, in the disease injection area 34 of the second user interface 27, the affected counties may show a significantly higher percentage of respiratory illness. Thus, an analyst comparing the two user interfaces 26, 27 may be able to quickly identify where an outbreak was injected, or at the least, identify the regions deserving added attention. Similarly, the corresponding time series views of nearby hospital and counties of user interfaces 28, 29 may indicate alerts 35. From user interfaces 28, 29, it can be seen that on Jul. 19, 2007, alerts 35 were generated for the three affected regions located within the disease injection area 34.

As shown in FIG. 5, the method 10 may additionally provide a user interface 30 with a more localized view, or a density estimate view, of where the outbreak may be occurring. Specifically, each view provided by the user interface 30 of FIG. 5 may provide color maps indicating the density of patients at various hospitals located throughout the state. Using the user interface 30, an analyst may scroll backwards in time prior to when the first alert was generated in the associated hospital time series and begin looking at the estimated patient density thereof. As shown in the successive views of FIG. 5, beginning on Jul. 17, 2007, the estimated density within the disease injection area 36 may remain consistent until the outbreak reaches its peak on Jul. 19, 2007. By indicating to analysts a higher concentration of patients across a very specific geographic region, the spatiotemporal model of the user interface 30 may allow the analysts to focus their attention to just those regions as opposed to needlessly initiating a multi-county or statewide alert.

In a prospective or proactive analysis, an analyst may monitor for alerts or analyzing potential future spreading of already confirmed alerts. In exploring one example of the proactive case analysis, an outbreak containing patients presenting signs of respiratory illness may be introduced on Dec. 29, 2007 that is still peaking on Dec. 31, 2007. The injection of patients may indicate that 6 patients were injected on Dec. 29, 2007, and 15 and 21 patients for each subsequent day. There may be no data provided beyond Dec. 31, 2007. In response to the outbreak, the method 10 of FIG. 1 may generate, for example, the user interfaces 31, 32 of FIG. 6 providing linked geospatial and/or temporal models. As shown, alerts 37 may be generated based on a particular hospital's time series data for three consecutive days, for example, from Dec. 29, 2007 to Dec. 31, 2007. An analyst viewing data for Dec. 29, 2007 via the user interface 31 may determine that the predicted number of patients visiting the hospital over the following two days is expected to be larger than the generated alert threshold. The analyst may further determine from the user interface 31 that the alert threshold for the affected county may be substantially less than the upper bounds of the prediction. Accordingly, the analyst may refer to the linked spatial models provided by the supplemental user interface 32. Specifically, the spatial models of the supplemental user interface 32 may indicate predicted hotspots across the state from Dec. 31, 2007 through Jan. 3, 2008. From the user interface 32, the analyst may be able to determine a particular hotspot 38 of interest that is located near the hospital in question. By tracking the hotspot 38 for subsequent days, the analyst may be able to determine that event levels remain relatively high on Jan. 1, 2008 and Jan. 2, 2008, and begin tapering off on Jan. 3, 2008. With such information, analysts may determine the origin, degree and expected length of such an outbreak, and if needed, proceed to issue a health alert that is more localized to the affected area.

Turning now to FIG. 7, an exemplary system 40 for forecasting hotspots is provided. The system 40 may include a computer or computational device 42, an input device 44 and an output device 46. The computational device 42 may include a microprocessor 48 and a memory 50. The algorithm for forecasting hotspots, for example, the method 10 of FIG. 1, may be stored or installed on the memory 50 of the computational device 42 so as to be readily accessible by the microprocessor 48. Alternatively, the microprocessor 48 may include on-board memory 51 similarly capable of storing the algorithm and allowing the microprocessor 48 access thereto. The algorithm may also be provided on a removable computer-readable medium 52 in the form of a computer program product. Specifically, the algorithm may be stored on the removable medium 52 as control logic or a set of program codes which configure the computational device 42 to perform according to the algorithm. The removable medium 52 may be provided as, for example, a compact disc (CD), a floppy, a removable hard drive, a universal serial bus (USB) drive, or any other computer-readable removable storage device. Upon inserting or electronically coupling the removable medium 52 to the microprocessor 48, the microprocessor 48 may be enabled to access the algorithm stored thereon. Furthermore, the input device 44 may include one or more of a wired or wireless network communication device, mouse, keyboard, touchpad, touch-screen display, or any other device suitable for communicating data to the microprocessor 48. The output device 46 may be implemented as a monitor, printer, or any other device suitable for displaying graphics.

During operation, the input device 44 may be configured to receive statistical input data 54 that may be required for modeling predictions for to one or more spatiotemporally distributed events. More specifically, the input data 54 may include a data set of statistical information that may be provided by analysts or transmitted electronically from an emergency department, or the like. From the input device 44, the input data 54 may be transmitted to the computational device 42. In some embodiments, the input data 54 may also be temporarily stored within the memory 50 for retrieval by the microprocessor 48. The computational device 42 may then proceed to convert the input data 54 into analytic output data 56 in accordance with the algorithm. Moreover, in response to the received input data 54, the microprocessor 48 may access the algorithm from any one of the storage devices 50, 51 and 52, to begin generating hotspot forecasts according to the method 10 of FIG. 1. Once the output data 56 has been determined, the microprocessor 48 may be enabled to render the analytic output data 56 in the form of one or more interactive user interfaces 26-32 displaying linked spatial and temporal model predictions. The microprocessor 48 may then be enabled to transmit the output data 56 and the associated user interfaces 26-32 to the output device 46 to be displayed or presented to the analyst.

Based on the foregoing, it can be seen that the present disclosure provides comprehensive systems and methods for forecasting hotspots. In addition to forecasting hotspots, the present disclosure is also capable of predicting the growth of detected hotspots so as to enable analysts to plan resource allocation and preventative measures accordingly. The present disclosure further provides systems and methods that are able to process a collection of substantially large data sets efficiently and with greater degree of accuracy.

While only certain embodiments have been set forth, alternatives and modifications will be apparent from the above description to those skilled in the art. These and other alternatives are considered equivalents and within the spirit and scope of this disclosure and the appended claims.

What is claimed is:

1. A method for forecasting hotspots on a computational device, comprising the steps of:
receiving input data at an input of the computational device;

generating a temporal prediction based on the input data, wherein the temporal prediction is based at least partially on a seasonal trend decomposition model based on locally weighted scatterplot smoothing (LOESS) applied to the equation $\sqrt{Y_t}=T_t+S_t+D_t+r_t$ where for the t-th day $Y_t$ is the time series for the temporal prediction, $T_t$ is the inter-annual component, $S_t$ is the yearly-seasonal component, $D_t$ is the day-of-the-week component and $r_t$ is the remainder;

generating a geospatial prediction based on the input data; and generating output data based on the time series and the geospatial prediction, the output data being configured to display at least one user interface at an output of the computational device.

2. The method of claim 1, wherein the input data includes time series corresponding to one or more of financial data, crime report data, emergency department log data, and syndromic surveillance data.

3. The method of claim 1, wherein the temporal prediction is based at least partially on a moving average model.

4. The method of claim 1, wherein the geospatial prediction is based at least partially on a geographically aggregated distribution of events.

5. The method of claim 1, wherein the geospatial prediction is based at least partially on a spatiotemporal distribution of events.

6. The method of claim 1, wherein the output data is generated using scalable three-dimensional kernel density estimation.

7. The method of claim 1, wherein the output data is adapted for multiple spatial aggregation schemes.

8. The method of claim 1, wherein the user interface provides linked spatial and temporal views.

9. A system for forecasting hotspots, comprising:
an input device;
an output device; and
a computational device coupled to each of the input and output devices, the computational device having a microprocessor and a memory for storing an algorithm for forecasting hotspots, the algorithm configuring the computational device to:
receive input data at the input device;
generate a temporal prediction based on the input data, wherein the temporal prediction is based at least partially on a seasonal trend decomposition model based on locally weighted scatterplot smoothing (LOESS) applied to the equation $\sqrt{Y_t}=T_t+S_t+D_t+r_t$ where for the t-th day $Y_t$ is the time series for the temporal prediction, $T_t$ is the inter-annual component, $S_t$ is the yearly-seasonal component, $D_t$ is the day-of-the-week component and $r_t$ is the remainder;
generate a geospatial prediction based on the input data;
generate output data based on the temporal and geospatial predictions; and
output a user interface to be displayed at the output device, the user interface being representative of the output data.

10. The system of claim 9, wherein the input device is a communications device configured to electronically receive the input data over a network.

11. The system of claim 9, wherein the output device is a display device configured to output interactive user interfaces.

12. The system of claim 9, wherein the input data includes time series corresponding to one or more of financial data, crime report data, emergency department log data, and syndromic surveillance data.

13. The method of claim 9, wherein the temporal prediction is based at least partially on a moving average model.

14. The system of claim 9, wherein the geospatial prediction is based at least partially on a spatiotemporal distribution of events.

15. The system of claim 9, wherein the output data is generated using scalable three-dimensional kernel density estimation.

16. The system of claim 9, wherein the user interface provides linked spatial and temporal views.

* * * * *